June 5, 1923.
R. A. WHITTINGHAM
MOTOR TRUCK AXLE
Filed Nov. 5, 1919
1,457,681
5 Sheets-Sheet 3
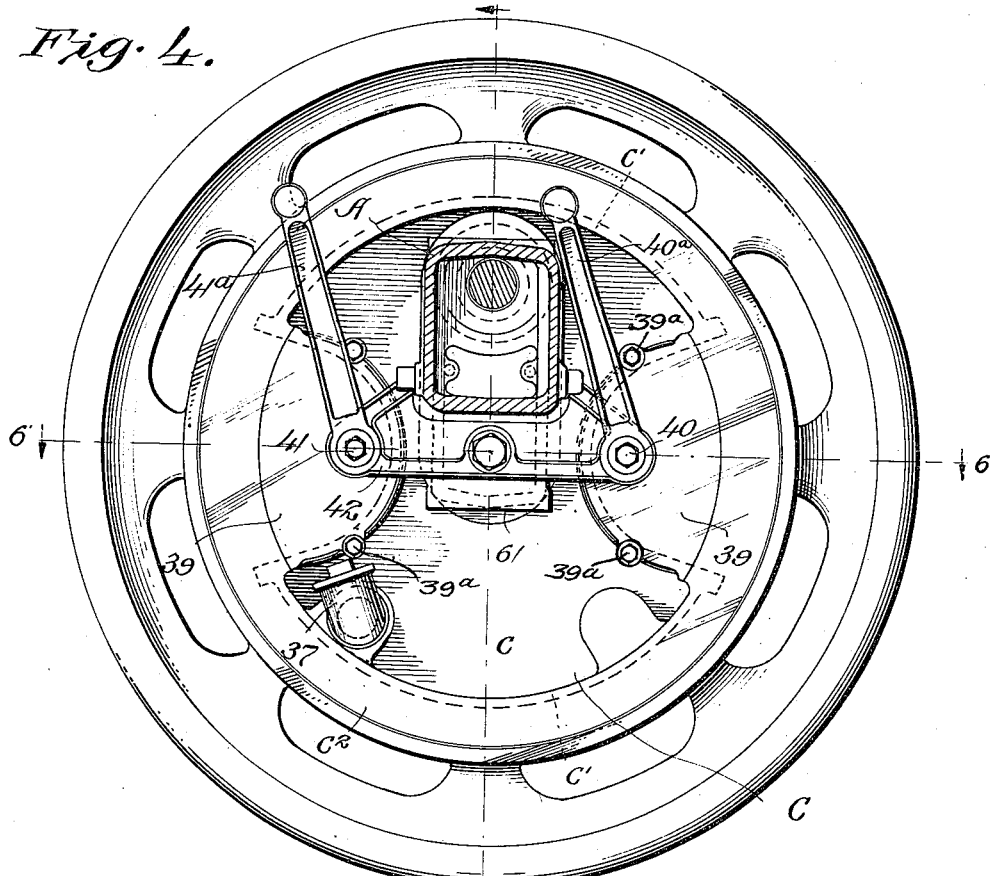

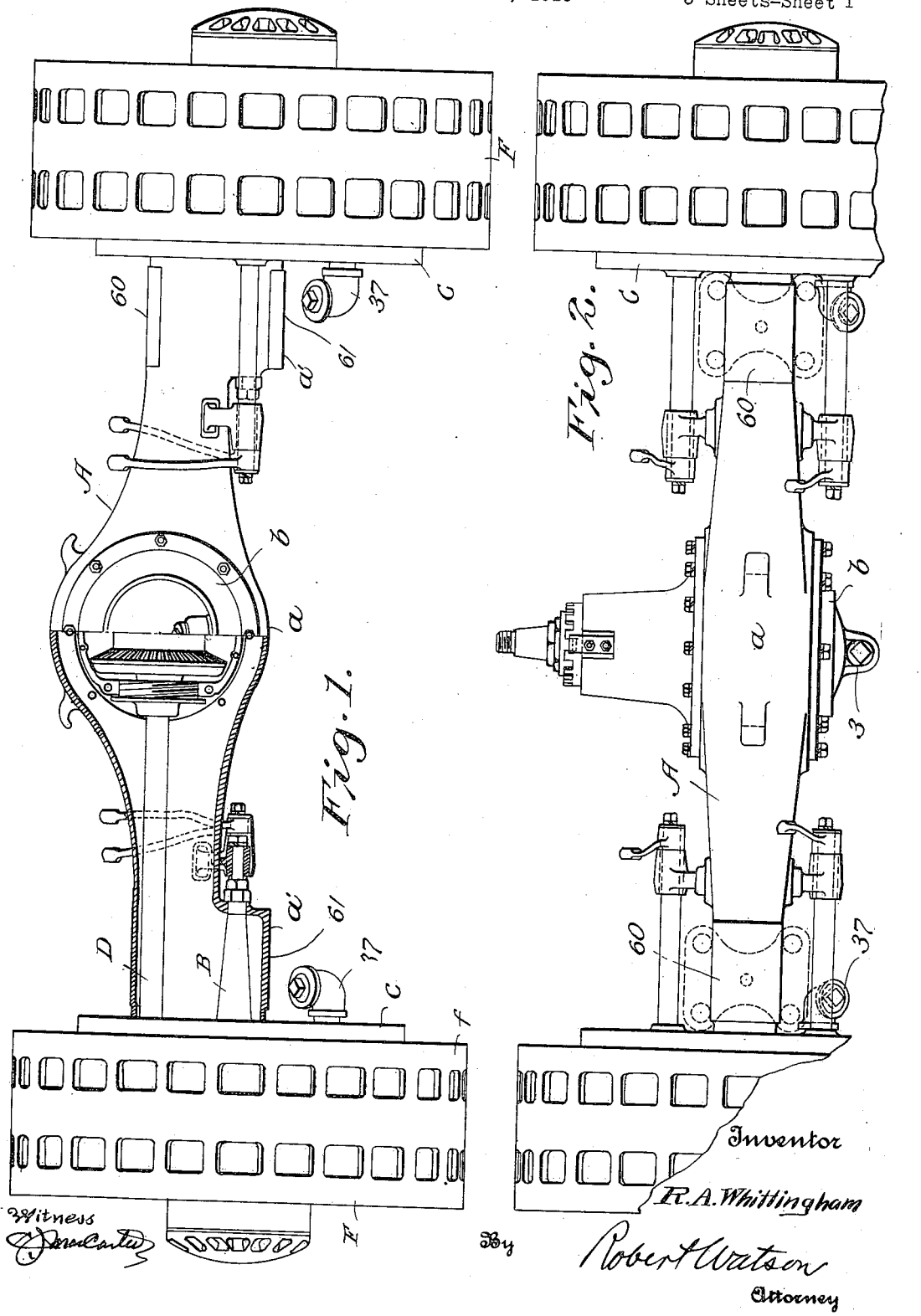

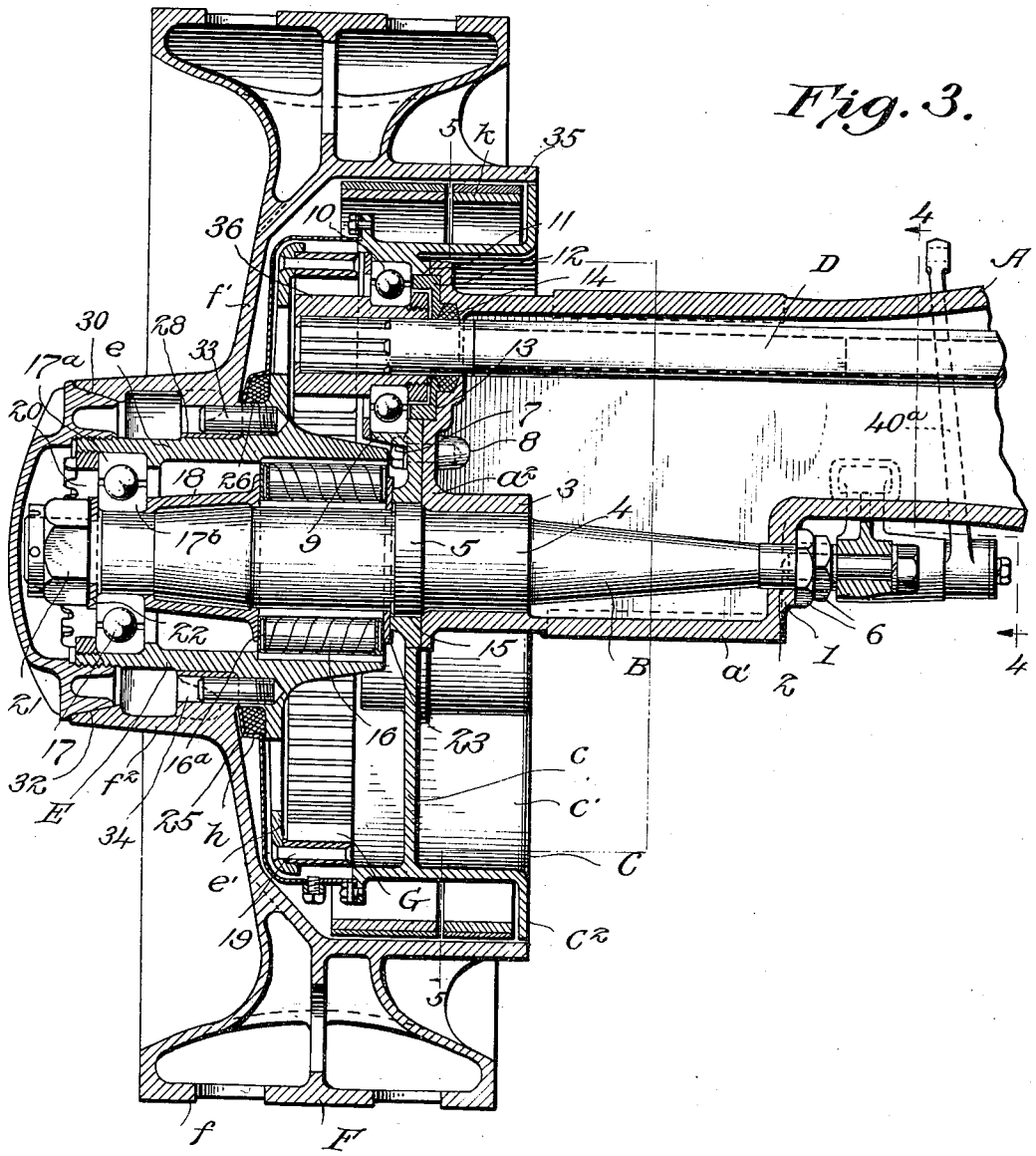

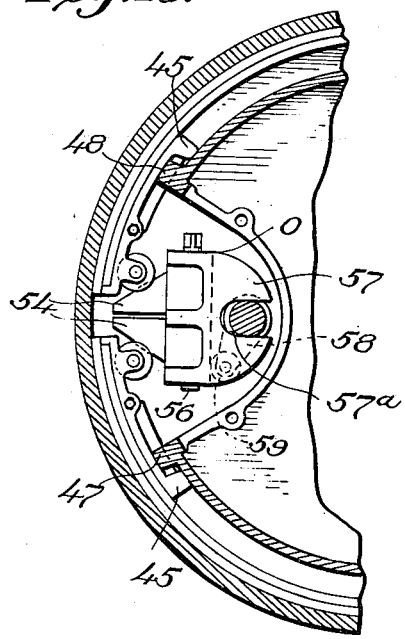
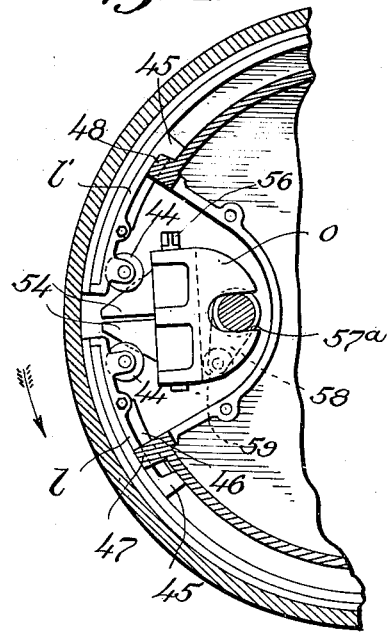
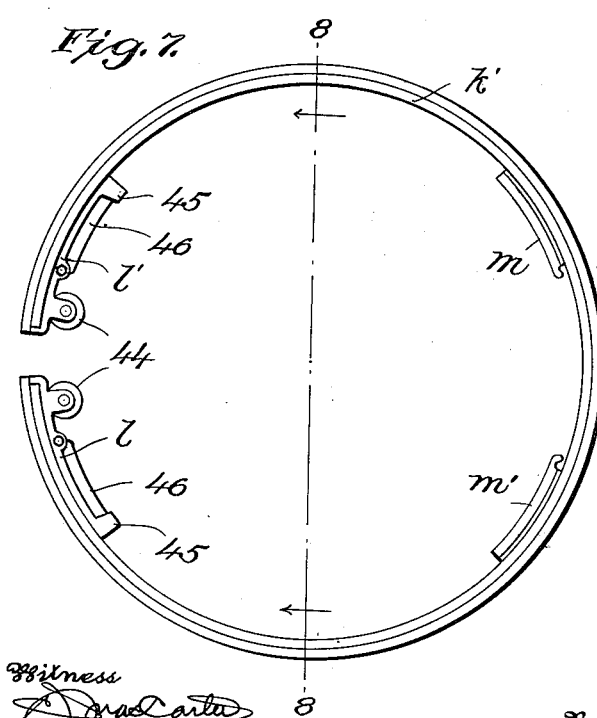
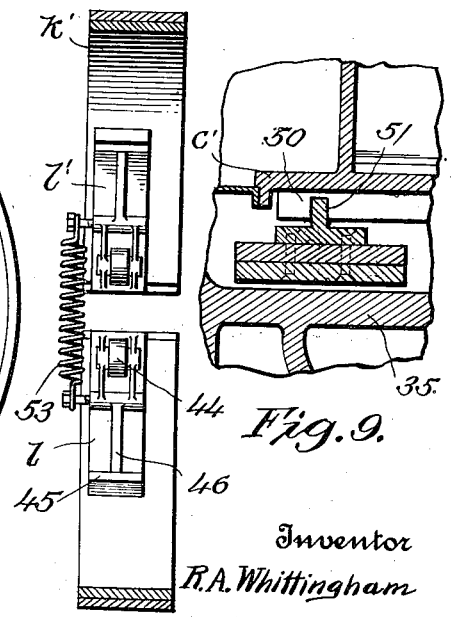

Patented June 5, 1923.

1,457,681

UNITED STATES PATENT OFFICE.

RICHARD A. WHITTINGHAM, OF NEWARK, DELAWARE, ASSIGNOR TO ATLAS AXLE COMPANY, OF WILMINGTON, DELAWARE, A CORPORATION OF DELAWARE.

MOTOR-TRUCK AXLE.

Application filed November 5, 1919. Serial No. 335,916.

*To all whom it may concern:*

Be it known that I, RICHARD A. WHITTINGHAM, a citizen of the United States, residing at Newark, in the county of New Castle and State of Delaware, have invented certain new and useful Improvements in Motor-Truck Axles, of which the following is a specification.

One object of this invention is to provide a rear axle for motor driven trucks which will be strong and durable and which will have a high clearance over the roadway; another object is to provide a rear axle construction wherein the driving shafts will be entirely enclosed within the axle housing which supports the load, and wherein the wheel spindles are mounted in said housing, so as to be readily removable; another object is to provide an axle and wheel construction wherein the bearings for the wheels are arranged centrally in the plane of rotation of the wheels; another object is to provide a wheel and axle construction wherein the wheel bearings and driving gears are entirely enclosed and self-lubricated; another object is to provide a wheel construction wherein the body of the wheel may be readily removed from and replaced upon the hub; another object is to provide entirely enclosed brake mechanism with means for causing the brake bands to engage the brake drum throughout the length of the bands when the brakes are applied. The invention also comprises other features of construction which will be clear from the following specification, taken in connection with the accompanying drawing, in which, Fig. 1 is a rear elevation of the truck axle, partly in section, showing the wheels attached;

Fig. 2 is a top plan view of the same;

Fig. 3 is a central, vertical section through one end of the axle housing and through the wheel and hub;

Fig. 4 is an inner side view of one of the wheels, the axle housing being shown in section on the line 4—4 in Fig. 3;

Fig. 5 is a section on the line 5—5 of Fig. 3, the covers for the brake operating cams being removed;

Fig. 7 is an edge view of one of the brake bands complete;

Fig. 8 is a section on the line 8—8 of Fig. 7;

Fig. 9 is a section on the line 9—9 of Fig. 5; and,

Figs. 10 and 11 are fragmentary sectional views similar to Fig. 5, illustrating the operation of the brake mechanism.

Figure 6:
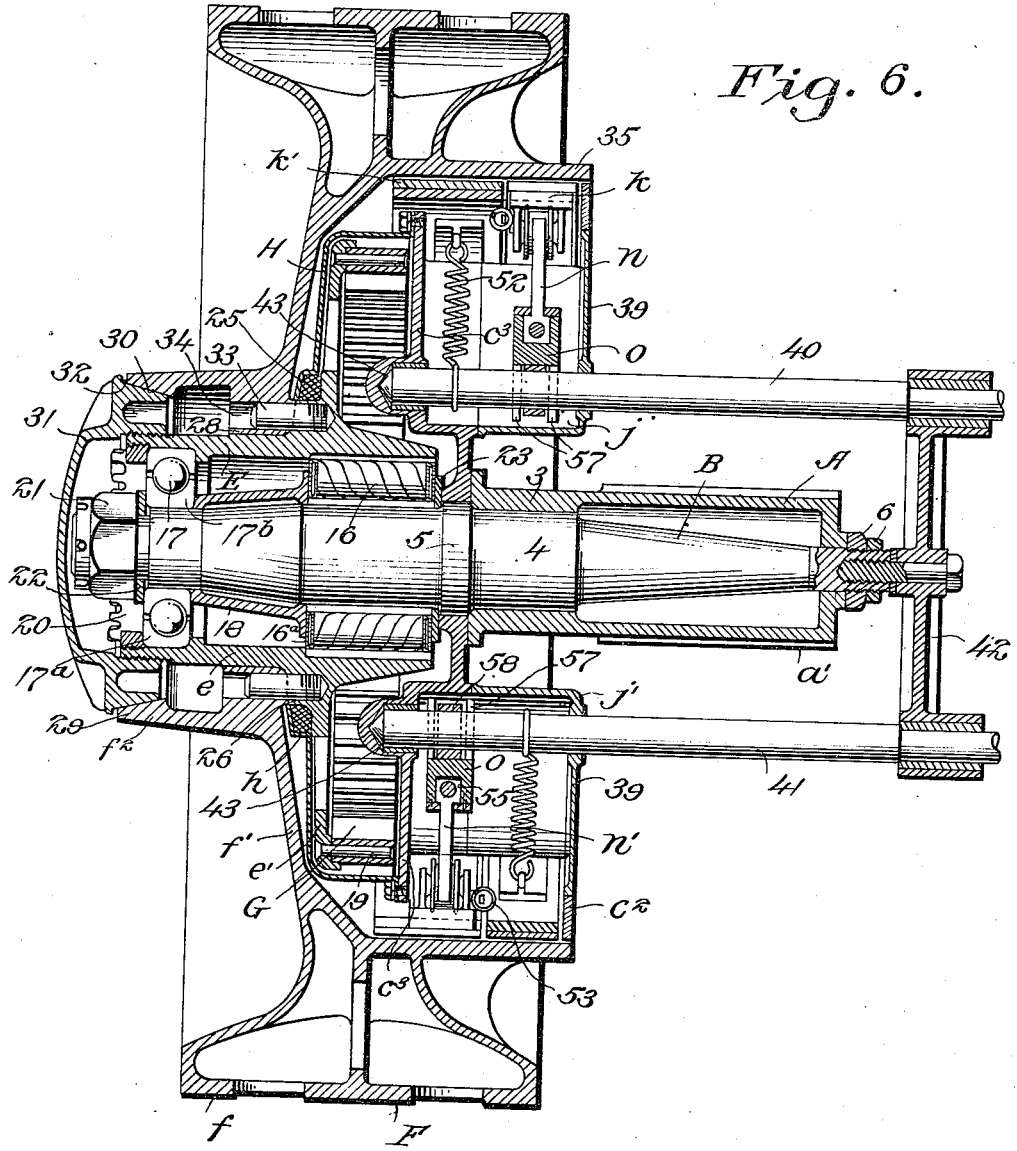
Fig. 6 is a section on the line 6—6 of Fig. 4.

Referring to Figures 1 and 2 of the drawing, A indicates the axle housing which is in the form of a box girder, enlarged at the center, as shown at $a$, to receive the differential mechanism, and having at its ends depending portions $a'$, and the housing is provided with end walls $a^2$, as shown in Fig 3. The differential mechanism is contained in a casing $b$, which is removably secured within the axle housing, as described in my co-pending application Serial No. 335,917, filed November 5, 1919. The depending end portion $a'$, at each end of the housing, has a vertical wall 1, provided with an opening 2, and the end wall $a^2$ of the housing has an inwardly projecting hollow boss 3 and the wheel spindle B extends through said boss and through the opening 2. This spindle has a cylindrical portion 4, which fits closely within the boss, and a collar 5 which fits against the end wall $a^2$. By means of lock nuts 6, threaded on to the end of the spindle and bearing against the outer surface of the wall 1, the spindle is drawn tightly into place and locked. It will be seen that the lock nuts are accessible at all times, being without the axle housing, and that it is therefore a simple matter to secure the spindle to the housing or to remove it from the housing. The housing and spindle constitute the dead axle for supporting the load.

The brake housing C has a web $c$ which is secured against the end wall $a^2$ of the housing by cap screws 7, which pass through said web and into bosses 8 on said end wall. On the web of the brake housing is a socket 9, which receives the ball bearing 10 for a drive shaft D, and in the bottom of the socket is a circular opening 11, in which is fitted a cup-shaped fitting 12, arranged in a recess 13 in the end wall of the axle housing. This fitting prevents any rotation of the brake housing with respect to the axle housing. The fitting has a circular opening through which the shaft D extends, and the fitting serves to retain in its place around the shaft a packing 14 for preventing oil from passing through the end of the housing. The boss 5 on the spindle B fits closely within an opening 15 in the web of the brake housing and the spindle forms the chief support for the brake housing. As the boss 5 is drawn firmly against the end of the axle housing by the nut 6, a joint is made at this point which will not permit oil to pass.

A wheel hub E is mounted upon the projecting end of the spindle, upon roller bearings 16, arranged in the plane of rotation of the wheel F and upon ball bearings 17, at the outer end of the spindle. This hub comprises a cylindrical portion $e$, having an interior annular projection 18, which serves to space the roller and ball bearings apart, and it has also a radially extending flange or web $e'$ to which is secured, by bolts 19, the internal gear G. The outer end of the cylindrical portion $e$ of the hub is internally and externally threaded, as shown in Figs. 3 and 6, and a ring 20, threaded into the end of the sleeve, locks the outer raceway $17^a$ of the ball bearing 17 against the internal projection 18 on the hub. The hub is held in position on the spindle by a nut 21, threaded on to the spindle, and bearing against a washer 22, which, in turn, bears against the inner raceway $17^b$ of the ball bearing. This raceway bears against the spacing projection 18, and the latter bears against the outer end of the roller bearing frame $16^a$. Between the inner end of said frame and the web $c$ of the brake housing is arranged a metal washer 23. It will be seen that by tightening the nut 21, the pressure will be transmitted through the raceway $17^b$, spacing projection 18 and the roller bearing frame $16^a$, against the washer 23, and the web of the brake housing, and the hub will be securely held in place upon the spindle.

A sheet metal oil pan H is secured to the brake housing, and this pan extends around the periphery of the internal gear G and radially inward on the outer side of the hub flange $e'$, and has an off-set portion $h$ which holds a packing ring 25 against an annular shoulder 26, formed on the hub at the point where the flange joins the cylindrical portion of the hub.

The wheel F comprises the rim $f$, web $f'$, and a hub portion $f^2$, the latter having a part 28 which fits closely upon the wheel hub and against the shoulder 26, and the outer portion 29 of the part $f^2$ being spaced from the wheel hub and having its end internally beveled, as shown at 30. A hub cap 31, threaded on to the outer end of the wheel hub has a beveled face 32, which engages the flaring face 30 on the hub portion of the wheel, and it will be evident that when the cap 31 is secured upon the hub E, the hub portion of the wheel body will be forced against the shoulder 26 and the body will be securely held in position. For the purpose of conveniently assembling the wheel body upon the hub and to prevent rotation of the body upon the hub, studs 33 are provided, these studs being threaded into the shoulder 26 on the wheel hub and projecting therefrom and adapted to fit closely into openings 34 drilled through the part 28 on the wheel body. The wheel body is formed with a brake drum 35, which extends inwardly from the web of the wheel and surrounds the brake housing.

It will be seen that the internal gear G and the driving pinion 36, on the shaft D, are enclosed by the web $c$ of the brake housing and the oil pan H and by the hub of the wheel and the hub cap. Lubricating oil may be inserted into the space between the web of the brake housing and the oil pan, below the wheel spindle, through a fitting 37, (Fig. 4) which is fitted into an opening in the web of the brake housing. When the wheel is in motion, this lubricant will be carried around by the internal gear to the pinion and to the bearing 10, and the oil, dripping from the gear and pinion, will also find its way into the axle hub and will lubricate the bearings 16 and 17.

The brake housing comprises two arcuate rim portions $c'$, concentric with the axis of the wheel spindle, and an integral annular flange $c^2$, which extends outwardly close to the inner end of the brake drum. Between the arcuate portions $c'$ of the rim, pockets $j$ and $j'$ are formed for containing the brake operating devices. In order to form these pockets, portions $c^3$ of the web of the housing are off-set toward the internal gear, and opposed to these off-set portions of the web are covers 39, which are removably secured to the web by cap screws $39^a$. These covers are formed so as to make a close fitting joint with the web and with the flange $c^2$ on the web, in order to exclude the dust.

Brake shafts 40 and 41 are journaled in a bracket 42, secured to the axle housing, and these shafts extend through openings in the covers 39 and into bearings 43, which are arranged in the off-set portions $c^3$ of the web of the axle housing. Levers $40^a$ and $41^a$ are arranged upon the shafts 40 and 41, respectively, for rocking the shafts to set or release the brakes. Within the brake drum and normally resting upon the arcuate portions $c'$ of the brake housing are an emergency brake band $k$, controlled by the shaft 40, and a service brake band $k'$, controlled by the shaft 41. These brake bands, except as to their width, and the devices for operating the same, are identical in structure, but in order to conveniently operate the bands from the separate brake shafts, the open ends of one band are diametrically opposite the open ends of the other band. Each band, as shown in Figs. 5, and 7 to 11, inclusive, has secured to its inner side, at its ends, a pair of guide pieces $l$ and $l'$, each guide piece having a roller 44 at one end, an inwardly projecting stop 45 at its opposite end, and a longitudinal guide rib 46 between the stop and the roller. Each band has also, secured to its inner face opposite the ribs $l$ and $l'$, a pair of guide ribs $m$ and $m'$, and at the ends of the arcuate portions $c'$ of the rim of the axle housing are transverse ribs 47, 48, 49, 50, and these ribs are provided with slots, running in a circumferential direction, to receive the guide ribs of the parts $l$, $l'$, $m$, $m'$ on the bands. One of these slots is shown at 51, in Fig. 9. As shown in Fig. 5, when the bands are in position, the guide ribs $m$, $m'$ of one band, $k'$ in this view, rest in the guide grooves in the ribs 49 and 50, and the guide portions 46 of the parts $l$, $l'$ rest in the guide grooves of the ribs 47 and 48. It will be seen that the projections 45 on the band are at opposite sides of the ribs 47 and 48, which latter constitute fixed stops. A pair of springs 52, connected between the brake shaft 40 and the guide pieces $m$, $m'$, tend to hold the central portion of the brake band away from the drum, and a spring 53, connected between the guide pieces $l$ and $l'$ tends to draw the ends of the brake band toward one another and to hold the ends of the band away from the brake drum. Thus, by the aid of the springs, the brake band is normally contracted and caused to rest upon the ribs 47, 48, 49, 50, of the brake drum housing. The brake band $k$ is also supported upon the ribs 48 to 50, inclusive, and held in position by similar springs, but the band is reversed with respect to the band $k'$ and for that reason the guide pieces $l$ and $l'$ of the brake band $k$ rest upon the ribs 49 and 50, while the guides $m$ and $m'$ rest upon the ribs 48 and 47.

In the pocket $j$, Figs. 5 and 6, is arranged a wedging device $n$, for forcing the ends of the band $k$ apart, and in the pocket $j'$ is arranged a similar device $n'$, for forcing the ends of the band $k'$ apart. As these wedging devices are alike, a description of one will apply to the other. The device for spreading the band $k'$ comprises two wedge plates 54, having oppositely inclined faces for engaging the rollers 44, and these wedge plates are arranged within a groove 55, (Fig. 6) in a block $o$, and are connected together by an adjusting screw 56, having reversely arranged threads on its opposite halves so that by turning the screw in one direction the wedge plates will be drawn together, and by turning the screw in the opposite direction, the wedge plates will be moved apart. This adjustment is provided for the purpose of compensating for wear of the brake linings. The block $o$ has parallel flanges 57, projecting oppositely from the wedge plates, and these flanges have alined slots 57$^a$ to receive the brake shaft 41. A cam 58, mounted on the rod 41, fits between the flanges on the web block and carries a roller 59, which is adapted to bear upon the back of the block.

When the shaft 41 is rocked to apply the service brake band $k'$ to the drum, the cam on said shaft causes the wedge plates to move radially outward and spread the ends of the brake band apart. The band is thus caused to expand and engage the brake drum throughout the length of the band. This is illustrated in Fig. 10. In this figure, it will be noted that the stops 45 on the brake band are moved away from the fixed stops 47 and 48 on the brake drum housing. If the wheel is not in motion and the brake is simply being tested, the movement of the wedge block out and in will cause both of the stops on the brake band to move away from the fixed stops, to equal distances. If the wheel is in motion, say in the direction of the arrow, Fig. 11, when the wedge block is thrown out, the ends of the brake band will be forced apart, but the instant the band is brought into engagement with the brake drum, the band will be carried bodily around for a short distance until the stop 45, at one end of the band, engages the fixed stop 48, which will limit the movement of said end, but the other stop 45 will be carried away from the fixed stop 47, and as there is no positive stop for this end of the band, the frictional engagement of the drum with the band will tend to further expand the band, and this will cause the band to press strongly against the drum throughout the length of the band. When the wedge blocks are withdrawn, the springs 52 and 53 will return the brake band to its normal position with the stops 45 thereon in engagement with the fixed stops. It will be seen that with the construction described, the power supplied by the movement of the wheel is utilized in applying the brakes. The operation of the brake band $k$ by the actuation of the brake shaft 40, as previously stated, is the same as the action described in connection with the shaft 41 and band $k'$.

It will be seen from the foregoing description that the brake mechanism is almost entirely arranged within the plane of rotation of the wheel and is housed in so as to exclude dirt to a large extent. It will also be seen that the gears and bearings are enclosed, so that the lubricating material may be retained and dust excluded, and it will also be seen that the various parts can be readily assembled or taken apart for repairs. Thus, in order to remove the wheel body, it is only necessary to unscrew the hub cap 31 when the body can be taken off, and this will expose the hub, oil pan and the brake bands. By removing the oil pan and then taking off the nut 21, the hub with its bearings and the internal gear may be taken off of the spindle. In order to gain access to the wedging devices and springs for operating the brake bands, it is only necessary to remove the covers 39.

Referring to the axle housing, it will be noted that flat parts 60 and 61 are provided upon the top and bottom walls of the housing, for receiving the spring attaching devices, and that these flat portions or seats are close to the wheels and that the side walls of the housing at these points have considerable depth owing to the downward extension of the housing at its ends. Thus, the load is supported close to the wheel bearings and upon portions of the housing having very great strength. It is also to be noted that the drive shafts D, only one of which is shown, are above the wheel spindles and that the axle housing has high clearance over the roadway.

What I claim is:

1. The combination with an axle housing and a wheel spindle projecting therefrom, of a brake housing comprising a web portion, secured to the end of the axle housing, a rim portion concentric with the spindle and an annular flange projecting radially outward from the inner end of the rim portion, said rim portion constituting a support for the brake bands, and a wheel mounted on said spindle and having a brake drum extending around said rim portion and close to said flange.

2. The combination with an axle housing and a wheel spindle projecting therefrom, of a brake housing comprising a web portion, secured to the end of the axle housing, a rim portion concentric with the spindle and projecting inwardly over the end of the axle housing and an annular flange projecting radially outward from the inner end of the rim portion, said rim portion constituting a support for the brake bands, a wheel on said spindle having a main bearing close to the axle housing and in the plane of rotation of the wheel tread, and a brake drum on said wheel surrounding the rim portion of the brake housing and extending close to said flange.

3. The combination with an axle housing and a wheel spindle projecting therefrom, of a brake housing comprising a web portion, secured to the end of the axle housing, a rim portion concentric with the spindle and an annular flange projecting radially outward from the inner end of the rim portion, said web and rim portions being suitably formed to provide pockets for receiving brake operating devices, and said pockets having removable covers, and a wheel mounted on said spindle and having a brake drum extending around said rim portion and close to said flange.

In testimony whereof I affix my signature.

RICHARD A. WHITTINGHAM.